United States Patent Office 3,315,419
Patented Apr. 25, 1967

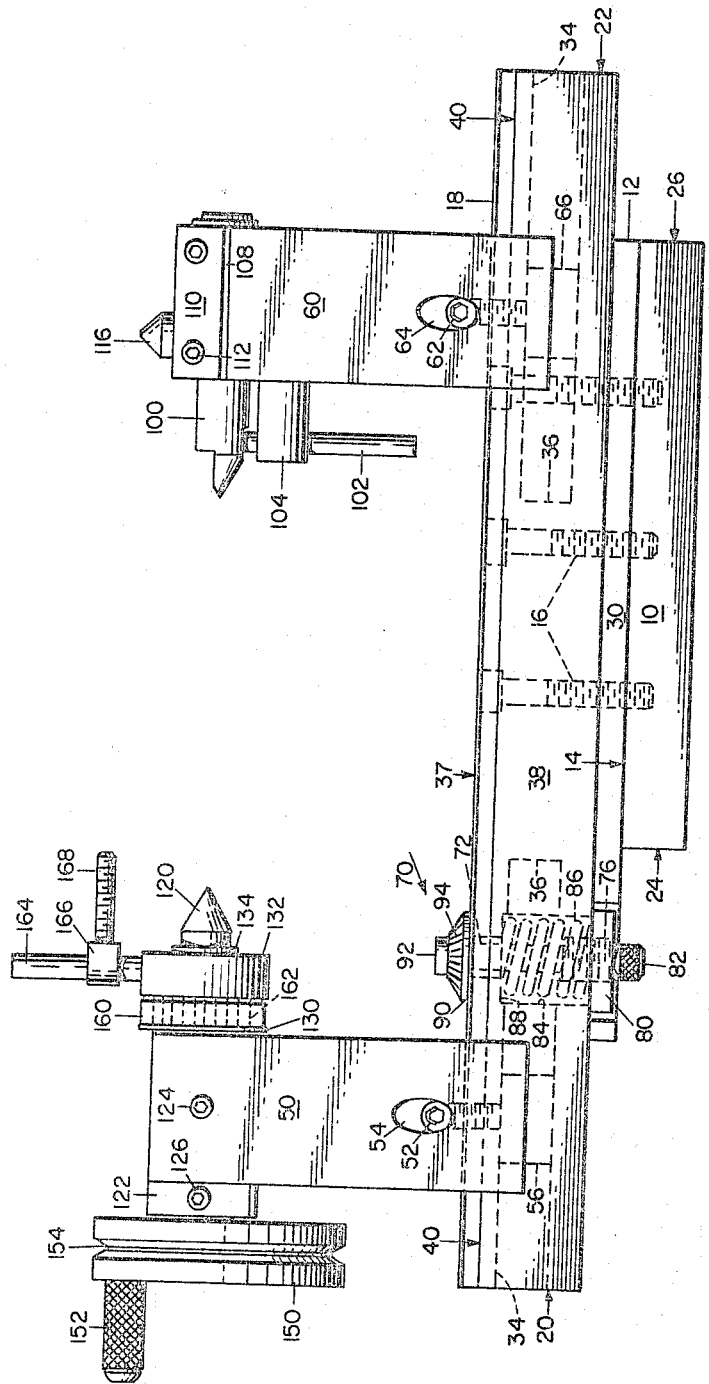

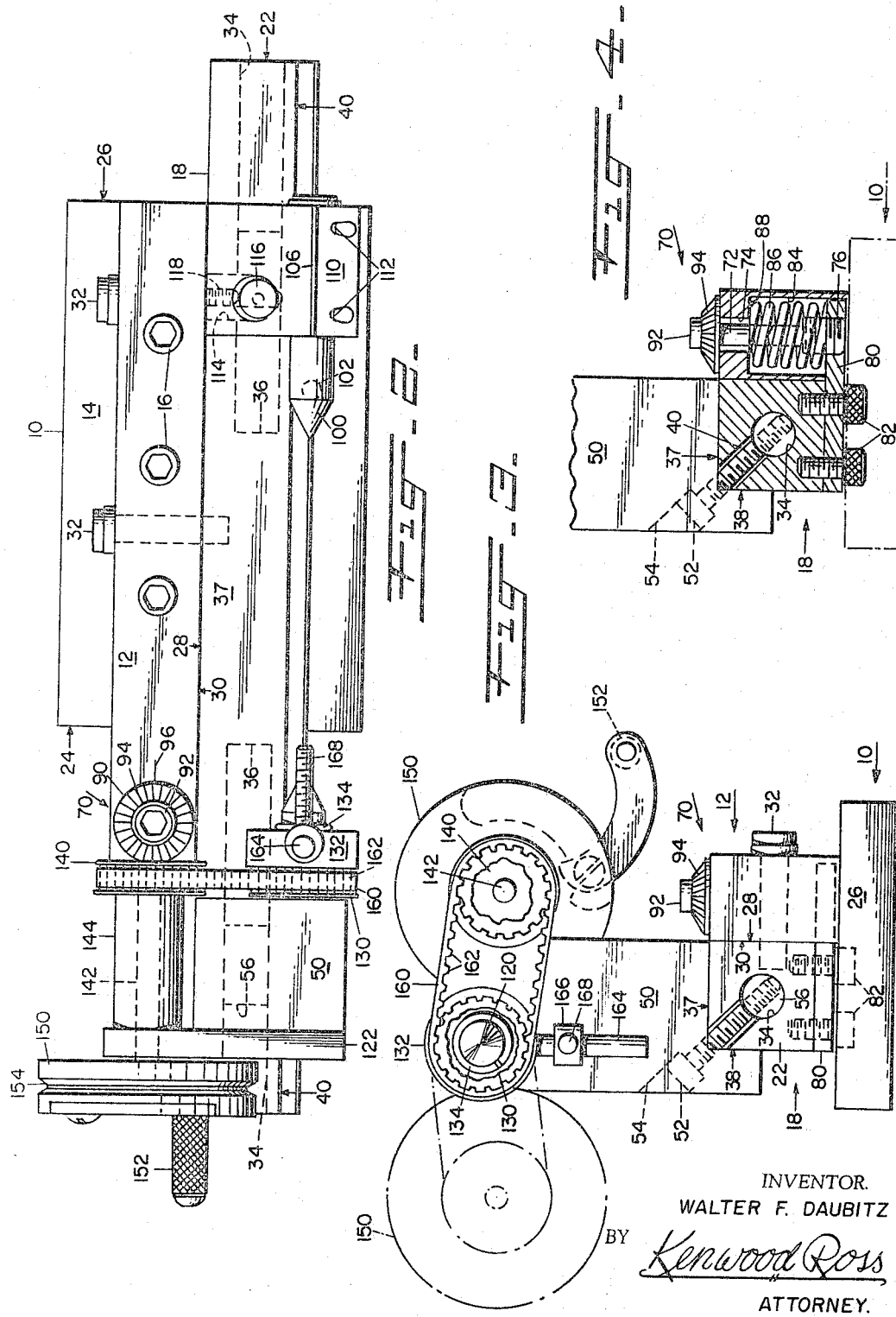

3,315,419
WORK HOLDING AND CENTERING MEANS
Walter F. Daubitz, Agawam, Mass., assignor to Oxford Precision, Inc., West Springfield, Mass., a corporation
Filed Mar. 18, 1964, Ser. No. 352,760
1 Claim. (Cl. 51—237)

My invention relates to new and useful improvements in work holding attachments for grinding or similar machines, and is directed particularly to a work holding and centering means for use in conjunction with machines such as surface grinders by means of which such machines may be adapted for cylindrical grinding and allied operations.

More specifically, the invention contemplates provision of an attachment for machines of the surface grinding type, for supporting the work for rotation about an axis predeterminedly disposed with respect to the normal plane of relative traverse between the grinding tool and the work.

Stated in another way, the invention may be said to relate to apparatus for centering a work piece while performing machining operations thereupon and comprehending elements carrying centers for supporting rotatably the work piece, said elements being relatively reciprocable in directions substantially along the axis of the work piece wherefor the elements may be adjustable toward and away from each other to accommodate work pieces of various lengths.

According to one feature of the invention, head and tail blocks are provided which are carried by a slide bar which may be adjustably fixed with respect to a centering rail so as to facilitate alignment of the axes of the centers and the work piece therebetween with the axis of the grinding wheel or the like and to allow attainment of a desired angular relationship of the axis of the work piece.

It is another object hereof to provide a device of the aforesaid character having means for maintaining a work piece relative to a support for presentation to a grinding tool or like machine in desired positions of adjustment about the axis of rotation of the work piece.

It is another object to provide a work holding and centering device having means for adjustably positioning the longitudinal axes of the centers and of the work piece relative to the grinding or like machine.

As still another feature hereof, I provide a device which is extremely simple in construction, yet which incorporates means for permitting minute adjustments whereby the finest grinding or other outside diameter work may be performed therewith.

As still another salient feature hereof, I provide a device which is adjustable to accommodate workpieces of varying lengths.

The invention further resides in certain structural and mechanical details, hereinafter set forth, by means of which the aforesaid major objects of the invention are attained and which contribute to the provision of an attachment characterized by extreme flexibility of adjustment and constituting a highly valuable precision adjunct for surface grinders capable of materially enlarging the scope of utility of machine tools of that basic type.

In the attached drawings:

FIG. 1 is a rear elevational view of a work holding and centering device embodying the novel features of the invention and illustrating the means for adjusting a work piece angularly with respect to the normal plane of relative traverse between the grinding tool and the work;

FIG. 2 is a top plan view of the device shown in FIG. 1;

FIG. 3 is an end elevational view of the device shown in FIG. 1 as viewed from the right, with certain parts having been broken away and others having been omitted for purposes of clarity; and FIG. 4 is a fragmentary sectional view taken transversely through the spring loaded jacking means of the invention and illustrating the details thereof.

With reference to the drawings, a preferred embodiment of the invention is therein illustrated and is shown as consisting of a bed plate 10 or stationary main support of generally rectangular form for supporting the device relatively to the bed of a grinder or like machine, not shown, all as is known.

Where the surface grinder is equipped with a magnetic work table and bed plate 10 is made of a ferrous metal, the attachment may be magnetically secured to said work table, in known manner. Where the work table may comprise the traversible member of the grinder, bed plate 10 may be positioned on the work table so as to bring the workpiece into engagement with the grinding tool along a given line and in the plane of traverse.

A longitudinally-extending, horizontally-disposed centering rail, designated by reference numeral 12, is fixed to an upper planar face 14 of bed plate 10 as by a plurality of vertically extending bolts or screws 16 threadedly engaged in suitable coaxially-aligned openings provided in said centering rail and bed plate.

A longitudinally-extending adjustably-mounted slide bar 18, having opposite end faces 20 and 22, each extending outwardly of the respective end face 24 and 26 of bed plate 10, is disposed upwardly of the upper planar face 14 of bed plate 10 and in coplanar relationship therewith and rearwardly of centering rail 12.

The slide bar is held upwardly of bed plate 10 by means now to be described. Centering rail 12 has a vertically-projecting rearwardly-facing side face 30 held in confrontation with the vertically-projecting forwardly-facing side face 28 of slide bar 18, with members 12 and 18 being strategically held in face-to-face contact as by a plurality of transversely-spaced, inwardly-extending, horizontally-disposed pins 32 receivable in suitable coaxially-aligned openings provided in the centering rail and slide bar. As will be appreciated from FIG. 3, said pins 32 are extendable inwardly from the front of the construction.

Slide bar 18 is provided at each of its opposite ends with a longitudinally-inwardly-extending annular recess 34 for purposes as will appear, said recesses being disposed centrally of and on the longitudinal axis of the slide bar and being coaxially-aligned as to each other, each having an inner terminal end or bottom wall 36.

At and adjacent the upper, rearward corner of slide bar 18, defined by the intersection of its upper horizontally-disposed planar surface 37 and rearward vertically-disposed planar surface 38, an angularly-disposed inwardly-extending slot 40 is provided throughout the longitudinal extent of the slide bar and communicating at its respective adjacent portions with annular recesses 34.

A head block or head stock 50 strategically located at one side of the slide block has a downwardly depending tail portion at its rearwardly-facing side thereby to provide a seat upon planar faces 37 and 38 of slide bar 18 wherefor said head block may extend vertically-upwardly from the slide bar and is slideably adjustable therealong by the means of a tightening or securing bolt 52 receivable in an angularly-disposed inwardly-extending locking opening provided therethrough, said opening being provided with an enlarged counterbore 54 adjacent the rearwardly-facing planar face of the head block for accommodating the bolt head. The bolt shank, additionally to being receivable through the head block locking opening, will be receivable through the slot 40 and into the respective adjacent recess 34, with its lower, innermost extremity being threadedly engaged with an elongated slide cylinder 56 loosely receivable within and slideable relative to its enclosing recess.

A tail block or tail stock 60 is similarly configured so as to seat upon and extend upwardly from the slide bar at the opposite side thereof and is likewise slidably adjustable therealong by means of a tightening or securing bolt 62 receivable in a similar angularly-disposed locking opening having an enlarged counterbore 64 with the bolt shank extending through the slot 40 and into the respective adjacent recess 34, and likewise with its lower, innermost extremity being threadedly engaged with an elongated slide cylinder 66 which is loosely receivable within and slideable relative to its enclosing recess.

Each said head and tail block may be engaged with the slide block at the respective end face 20 and 22 thereof as by introducing its respective slide cylinder into its respective recess and its respective bolt into the respective end of the slot, and by seating same upon the upper and rearwardly-facing planar surfaces of the slide block.

Each said head and tail block may be slidingly moved relative to the slide block to the extent as determined by the length of the respective recess, and may be stationarily secured relative thereto as by a tightening of the respective tightening bolt relative to its slide cylinder which is understandably non-rotatable within its respective recess.

It is within comprehension that either one of said head or tail blocks may be permanently fixed relative to or formed unitary with the slide bar, in which instance only one end of the slide bar would be so recessed and slotted as above described.

In this manner, the distance between the head and tail blocks may be varied at the will of the operator, for purposes as will appear.

Slide bar 18 is movable relative to centering rail 12 for purposes of aligning adjustment of the longitudinal axes of the centers by way of a jack means, generally indicated by reference numeral 70. A vertically-extending opening 74, extending inwardly from the upper planar surface of the centering rail, communicates with an enlarged vertically-extending coaxially-aligned opening 84 extending inwardly from the lower planar surface of the centering rail.

A vertically-extending pin 72 has an enlarged annular lower foot portion 76, which foot portion is externally threaded, and is extendable through the aligned openings 74 and 84. The threaded foot portion is threadedly engageable in a vertically-aligned opening in a retaining plate 80, which plate is fixed at one end to the lower or bottom planar face of slide bar 18 as by bolts 82 and extends horizontally and forwardly therefrom in manner to underlie the lower planar face of the centering rail.

Within enlarged opening 84 of the centering rail, a compression spring 86 is disposed, in sleeved relationship to pin 72, with its lowermost face seating upon the upper planar face of retaining plate 80, and with its uppermost face embracing the annular shoulder 88 defined by the uppermost wall of the enlarged opening.

An annular disclike dial 90 is rigidly fixed to the upper extremity of pin 72 in manner to bear upon the upper planar face of the centering rail and to enclose the opening 74, the dial being provided with a centrally-located upwardly-facing wrench or tool-receiving depression 92 for the insertion thereinto of a suitable wrench or tool whereby rotation of the pin may be effectuated.

The peripheral surface of dial 90 is delineated with graduations 94 which are registrable in seriatim with a sight line 96 provided on the upper planar face of the centering rail for the well known purpose of indicating degrees of rotation, in this instance degrees of rotation of pin 72.

Tension upon compression spring 86 may be increased or decreased according to the direction of rotation of pin 72 as dictated by readings on dial 90. As tension on spring 86 is decreased, by the rotation of pin 72 in one direction, spring 86 acts with a jacking force upon retaining plate 80 and shoulder 88 of opening 84 so as to raise the adjacent end of slide bar 18 with respect to centering rail 12 upon the pivot constituted by right pin 32 as viewed in FIG. 2. Conversely, rotation of pin 72 in an opposite direction compresses spring 86 so as to move the adjacent end of slide bar 18 downwardly.

Tail block 60 is provided with a pair of vertically-aligned horizontally-disposed openings extending longitudinally therethrough from end to end thereof, in the upper of which a tail center 100 is receivable and in the lower of which a post 104 is receivable said tail center and post being so arranged as to project outwardly of the inner end face thereof, as shown.

A vertically-disposed anti-rotation pin 102 is receivable through a suitable opening in post 104 outboard of tail block 60 and functions to preclude rotation of said tail center.

At its upper surface, tail block 60 is provided with a vertically-extending slot which communicates with the upper of the horizontally-disposed openings, in which slot a yieldable shim 106 may be nestably received.

At its forwardly-facing surface, tail stock 60 is provided with a horizontally-extending slot in which a yieldable shim 108 may be nestably received.

The portion of the tail stock intermediate the two slots is defined as a bearing portion 110 and bolts 112 may be extended through suitably provided threaded openings in said bearing portion for purposes of causing said bearing portion to bear upon tail center 100 with varying degrees of pressure, wherefor the looseness or tightness of the tail center relative to the tail block may be controlled. As the bearing portion is brought to bear tightly against the tail center, its longitudinal sliding movement is precluded.

Additionally, tail block 60 may be provided with a vertically-disposed opening 114 extending inwardly from the top planar surface thereof, in which opening a diamond 116 may be disposed and a threaded opening extending inwardly from the forwardly facing face of the tail block may receive a set screw 118 which may be caused to bear against the diamond so as to secure same relative to the tail block.

A head center 120 is secured within a suitably provided head center opening and has a working extremity extending outboard of the head block at one end thereof, as shown.

Outboard of the head block on the opposite end a leaf 122 is provided, same having a head center receiving opening coaxially aligned with the head center opening of the head block, wherefor the nonworking extremity of the head center may be received therewithin.

The head center is secured to the head block as by a bolt 124 and to the leaf as by a bolt 126.

A primary sprocket 130 circumscribing an annular retainer plate 132 is rotatably mounted upon head center 120 adjacent head block 50, and a split ring 134 is sleeved upon the head center in manner to bear against the retainer plate so as to preclude any displacement of the primary sprocket outwardly of the head block.

A secondary sprocket 140 is fixed to one end of a drive shaft 142 rotatably fixed in a bushing 144 extending between the secondary sprocket and leaf 122. As will appear the drive shaft may be driven by a handwheel or may be power driven.

Drive shaft 142 extends through another opening in the leaf and is journalled at its outermost end in the hub of a drive wheel 150.

Drive wheel 150 is provided with a manually engageable knurled knob 152 for allowing manual rotation of the drive shaft and is additionally provided with a peripherally-located V-groove 154 should it be desired to effectuate rotation of the drive shaft by a motor driven drive belt or equivalent means.

An endless timing belt 160 is entrained about the primary and secondary sprockets, same having a plurality of spaced steps or treads 162 on its inner face engageable with said sprockets in known manner, whereby as said hand wheel 150 is rotated, secondary sprocket 140 is rotated so as to drive primary sprocket 130 and retainer ring 132.

Means for driving the work comprises a post 164 extending radially outwardly from retainer ring 132. The post carries a boss 166 centrally of its length which carries a pin 168, said pin being engageable with a lathe dog on a workpiece, both not shown, in known manner.

The workpiece is rotatably supported by the centers 100 and 120 for the work operations.

The tail stock and head stock blocks are slideably longitudinally along slide bar 18 whereby the device may be quickly and easily set up to accommodate workpieces of varying lengths.

The jack means 70 makes it possible to align the longitudinal axes of the centers and the workpiece, simply by rotation of the dial 90.

As shown in phantom in FIG. 3, drive wheel 150, drive shaft 142 and secondary sprocket 140 may be moved from one side of the device to the other, same being accomplished through the rotation of leaf 122 about an axis defined by head center 120, this novel improvement making it possible to work from either side of the machine.

If grinding of the work piece is desired at an angle to this normal axis, as in the case of tapered ends of a workpiece, the centering rail and slide bar may be tilted to the required angle by rotation of the dial so as to raise or lower head center 120, wherefore the desired angular grinding of the ends of the work piece may be effected without disturbing the work piece in its supports.

I claim:

A device for supporting a work piece for outside diameter grinding or other operation comprising in combination, a horizontal bed plate, a centering rail connected to said bed plate, a slide bar connected to said centering rail, head and tail blocks having lower portions slideably fitting said slide bar and extending vertically upwardly therefrom, securing means for releasably securing said lower portions of said blocks to said slide bar at various distances apart, aligned head and tail centers in said head and tail blocks respectively, means for adjustably positioning the axes of said centers including a retaining plate fixed at one end to said slide bar and having its opposite end disposed below said centering rail and a spring-loaded jack pin rotatably mounted in said centering rail and threadedly engaged with said opposite end of the retaining plate and a dial on said jack pin having graduations registrable with indicia of said centering rail, and driving means for rotating a work piece rotatably supported by and between said centers including a primary sprocket rotatably mounted on said head center and a secondary sprocket pivotally linked to said head center and an endless timing belt entrained about said sprockets and having steps engageable therewith and a drive wheel connected to said secondary sprocket.

References Cited by the Examiner

UNITED STATES PATENTS

| 1,612,043 | 12/1926 | Nonneman | 74—228 |
| 2,120,928 | 6/1938 | Brump | 51—101 |
| 2,428,248 | 9/1947 | Strong | 51—237 |
| 2,834,163 | 5/1958 | Fay | 51—237 |
| 2,855,688 | 10/1958 | Comstock | 51—240 |
| 2,988,862 | 6/1961 | Krueger | 51—240 |
| 3,120,725 | 2/1964 | Milewski | 51—237 |

HAROLD D. WHITEHEAD, *Primary Examiner.*